(12) United States Patent
Shin et al.

(10) Patent No.: US 8,394,299 B2
(45) Date of Patent: Mar. 12, 2013

(54) PRECURSOR FOR THE PREPARATION OF A LITHIUM COMPOSITE TRANSITION METAL OXIDE

(75) Inventors: Ho Suk Shin, Seoul (KR); Sung Kyun Chang, Daejeon (KR); Hong-Kyu Park, Daejeon (KR); Seung Tae Hong, Daejeon (KR); Sinyoung Park, Daejeon (KR); Youngsun Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/673,480

(22) PCT Filed: Apr. 2, 2009

(86) PCT No.: PCT/KR2009/001689
§ 371 (c)(1),
(2), (4) Date: Oct. 26, 2011

(87) PCT Pub. No.: WO2009/145471
PCT Pub. Date: Dec. 3, 2009

(65) Prior Publication Data
US 2012/0043499 A1    Feb. 23, 2012

(30) Foreign Application Priority Data
Apr. 3, 2008 (KR) .................. 10-2008-0031083

(51) Int. Cl.
*H01B 1/12* (2006.01)
*H01B 1/02* (2006.01)
*H01B 1/06* (2006.01)
*C01B 13/00* (2006.01)
*C01C 1/00* (2006.01)
*C01D 1/02* (2006.01)
*C01G 37/14* (2006.01)
*C01G 45/12* (2006.01)
*C01F 7/00* (2006.01)
*C01F 11/02* (2006.01)
*H01M 6/04* (2006.01)
*H01M 4/02* (2006.01)
*H01M 4/13* (2010.01)
*H01M 4/58* (2010.01)

(52) U.S. Cl. .................. 252/521.2; 252/500; 252/521.4; 423/593.1; 423/594.2; 423/594.4; 423/594.6; 423/596; 423/599; 423/600; 423/594.16; 429/189; 429/209; 429/231.95; 429/231.1; 429/231.3

(58) Field of Classification Search ................... 252/500, 252/521.2, 521.4; 423/593.1, 594.2, 594.4, 423/594.6, 596, 599, 600, 594.16; 429/189, 429/209, 231.1, 231.3, 231.95
See application file for complete search history.

(56) References Cited

U.S. PATENT DOCUMENTS

| | | | |
|---|---|---|---|
| 6,083,474 A * | 7/2000 | Nakamura et al. | 252/519.1 |
| 6,660,432 B2 * | 12/2003 | Paulsen et al. | 429/231.3 |
| 7,648,693 B2 * | 1/2010 | Paulsen et al. | 423/594.4 |
| 2004/0223905 A1 | 11/2004 | Zou et al. | |
| 2006/0068289 A1 | 3/2006 | Paulsen et al. | |
| 2006/0188781 A1 * | 8/2006 | Thackeray et al. | 429/231.1 |
| 2008/0160410 A1 * | 7/2008 | Sun et al. | 429/220 |
| 2009/0224201 A1 * | 9/2009 | Paulsen et al. | 252/182.1 |

FOREIGN PATENT DOCUMENTS

| | | |
|---|---|---|
| JP | 2005-194106 A | 7/2005 |
| KR | 10-2002-0054534 A | 7/2002 |
| KR | 10-2006-0051055 A | 5/2003 |
| KR | 10-2006-0035547 A | 4/2006 |
| KR | 10-0616475 B1 | 8/2006 |
| KR | 10-2006-0134631 A | 12/2006 |
| KR | 10-0725399 B1 | 5/2007 |
| KR | 10-2007-0082902 A | 8/2007 |
| WO | WO 2006070977 A1 * | 7/2006 |
| WO | WO-2007/094645 A1 | 8/2007 |
| WO | WO 2007129854 * | 11/2007 |

\* cited by examiner

*Primary Examiner* — Harold Pyon
*Assistant Examiner* — Tanisha Diggs
(74) *Attorney, Agent, or Firm* — Birch, Stewart, Kolasch & Birch, LLP

(57) ABSTRACT

Provided is a transition metal precursor comprising a composite transition metal compound represented by Formula I, as a transition metal precursor used in the preparation of a lithium-transition metal composite oxide:

$$M(OH_{1-x})_2 \tag{1}$$

wherein M is two or more selected from the group consisting of Ni, Co, Mn, Al, Cu, Fe, Mg, B, Cr and transition metals of period 2 in the Periodic Table of the Elements; and $0<x<0.5$.

13 Claims, 3 Drawing Sheets

PRECURSOR FOR THE PREPARATION OF A LITHIUM COMPOSITE TRANSITION METAL OXIDE

This is an application filed under 35 U.S.C. 371 of PCT/KR2009/001689 filed Apr. 2, 2009, which claims priority from KR 1020080031083, filed Apr. 3, 2008.

FIELD OF THE INVENTION

The present invention relates to a novel precursor for the preparation of a lithium composite transition metal oxide. More specifically, the present invention relates to a transition metal precursor which is used in the preparation of a lithium transition metal oxide and contains a certain composite transition metal compound.

BACKGROUND OF THE INVENTION

Technological development and increased demand for mobile equipment have led to a rapid increase in the demand for secondary batteries as an energy source. Among other things, lithium secondary batteries having a high-energy density and voltage, a long cycle lifespan and a low self-discharge rate are commercially available and widely used.

As a cathode active material for the lithium secondary battery, lithium-containing cobalt oxide ($LiCoO_2$) is largely used. In addition, consideration has also been made of using lithium-containing manganese oxides such as $LiMnO_2$ having a layered crystal structure and $LiMn_2O_4$ having a spinel crystal structure, and lithium-containing nickel oxides ($LiNiO_2$).

Of the aforementioned cathode active materials, $LiCoO_2$ is currently widely used due to superior general properties such as excellent cycle characteristics, but suffers from disadvantageous problems such as low safety, expensiveness due to finite resources of cobalt as a raw material, and the like. Lithium manganese oxides such as $LiMnO_2$ and $LiMn_2O_4$ are abundant resource materials and advantageously employ environmentally-friendly manganese, and therefore have attracted a great deal of attention as a cathode active material capable of substituting $LiCoO_2$. However, these lithium manganese oxides suffer from shortcomings such as a low capacity and poor cycle characteristics.

Whereas, lithium/nickel-based oxides such as $LiNiO_2$ are inexpensive as compared to the cobalt-based oxides and exhibit a high discharge capacity upon charging to 4.25 V. The reversible capacity of doped $LiNiO_2$ approximates about 200 mAh/g which exceeds the capacity of $LiCoO_2$ (about 153 mAh/g). Therefore, despite somewhat lower average discharge voltage and volumetric density of $LiNiO_2$, commercial batteries containing $LiNiO_2$ as a cathode active material exhibit an improved energy density. To this end, a great deal of intensive research is being actively undertaken on the feasibility of applications of such nickel-based cathode active materials for the development of high-capacity batteries. However, the $LiNiO_2$-based cathode active materials still suffer from some weakness which have not been sufficiently solved, such as high production costs, swelling due to gas evolution in the fabricated batteries, poor chemical stability, high pH and the like.

Many prior arts focus on improving properties of $LiNiO_2$-based cathode active materials and manufacturing processes of $LiNiO_2$. For example, a lithium-transition metal composite oxide has been proposed wherein a portion of nickel is substituted with another transition metal element such as Co, Mn, etc.

Lithium transition metal active materials containing two or more materials of Ni, Co and Mn cannot be easily synthesized by a simple solid-state reaction. There is known in the art a technique using a transition metal precursor prepared by co-precipitation or the like, as a precursor for the preparation of such lithium transition metal active materials.

This type of transition metal precursor has been studied to prepare lithium transition metal oxides which are intended to express desired performance through the prevention of tap density lowering by control of the particle size or the optimization of particle shape by spheronization or the like.

In spite of various attempts which have been made as above, there is a strong need in the art for the development of a lithium transition metal oxide having satisfactory performance and a transition metal precursor for preparing the same.

SUMMARY OF THE INVENTION

Therefore, the present invention has been made to solve the above problems and other technical problems that have yet to be solved.

As a result of a variety of extensive and intensive studies and experiments to solve the problems as described above, the inventors of the present invention have developed a novel precursor containing a composite transition metal compound having an oxidation number approximate to an oxidation number of a transition metal in a lithium-transition metal composite oxide, and have demonstrated that a lithium secondary battery can exhibit excellent performance, when the lithium-transition metal composite oxide is prepared using the thus-developed precursor. The present invention has been completed based on these findings.

DETAILED DESCRIPTION OF PREFERRED EMBODIMENTS

Figure 1:
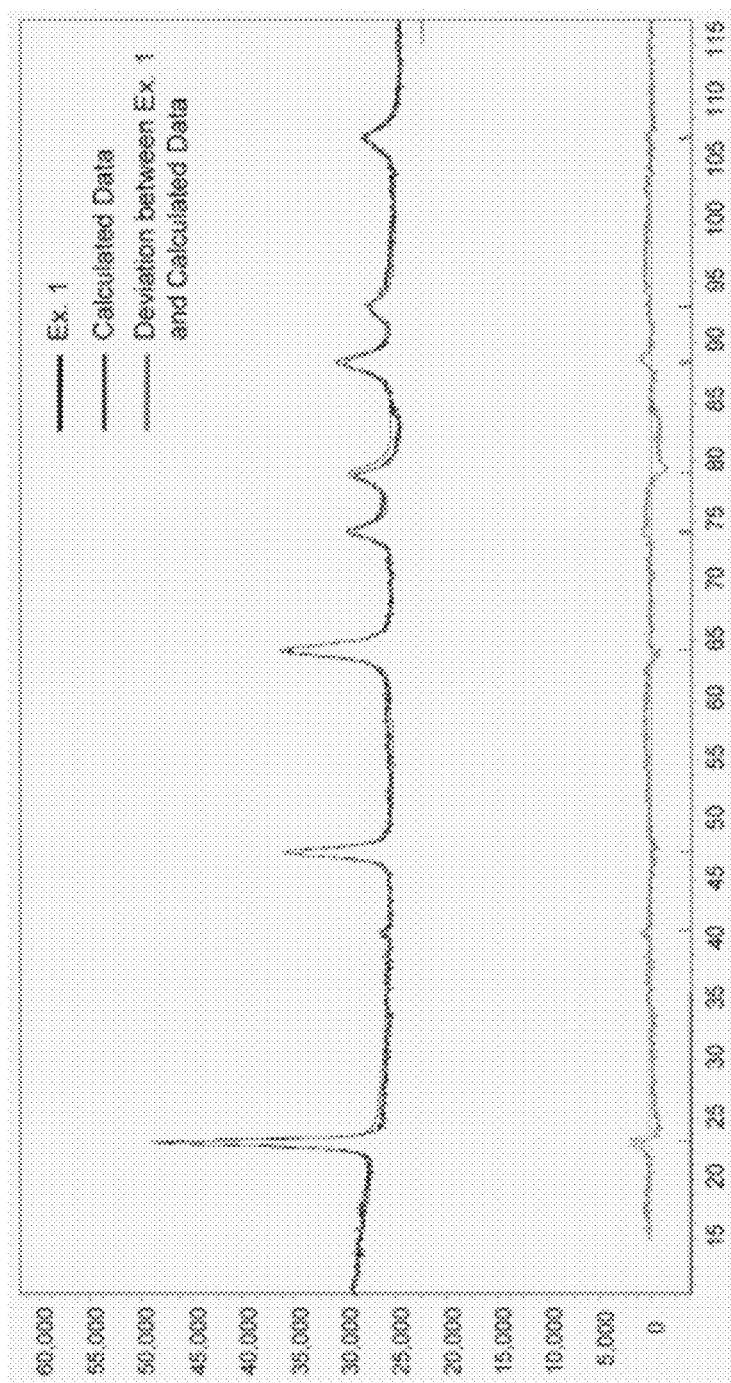
FIG. 1 is a graph showing the results obtained in Experimental Example 1.

In accordance with an aspect of the present invention, the above and other objects can be accomplished by the provision of a transition metal precursor comprising a composite transition metal compound represented by Formula 1 below, as a transition metal precursor used in the preparation of a lithium-transition metal composite oxide which is an electrode active material for a lithium secondary battery:

$$M(OH_{1-x})_2 \qquad (1)$$

wherein M is two or more selected from the group consisting of Ni, Co, Mn, Al, Cu, Fe, Mg, B, Cr and the transition metals of 2 period in the Periodic Table of the Elements; and $0 < x < 0.5$.

That is, the transition metal precursor in accordance with the present invention contains a novel composite transition metal compound which has an oxidation number of the transition metal greater than +2 and preferably an oxidation number of the transition metal close to +3 that corresponds to a transition metal oxidation number of the lithium-transition metal composite oxide.

When a lithium-transition metal composite oxide is prepared using such a transition metal precursor, an oxidation or reduction process for varying an oxidation number can be simplified, resulting in superior process efficiency. In addition, the-thus prepared lithium-transition metal composite oxide not only exhibits excellent performance as a cathode active material, but also shows significantly less production of reaction by-products such as $Li_2CO_3$ or $LiOH.H_2O$, which consequently can provide a solution to problems such as gelation of slurry, deterioration in high-temperature performance of the fabricated battery, swelling at high temperatures, etc., due to undesirable by-products.

As a transition metal precursor for the preparation of lithium-transition metal composite oxides by a co-precipitation method, materials such as $M(OH)_2$ and MOOH have been proposed in the conventional art.

$M(OH)_2$ has an oxidation number of the transition metal (M) of +2, so it still suffers from the aforementioned problems. MOOH has an oxidation number of the transition metal (M) of +3 which is equal to that of a transition metal oxide in the lithium-transition metal composite oxide, and therefore it is an ideal material. Unfortunately, it is substantially very difficult to synthesize MOOH.

Hereinafter, synthesis of the lithium-transition metal composite oxide will be described in more detail.

For example, when a composite transition metal hydroxide in the form of $M(OH)_2$ (M=Co, Ni, Mn) is used as a precursor for the preparation of a lithium-transition metal composite oxide containing Co, Ni and Mn, a transition metal in the composite transition metal hydroxide has an oxidation number of +2. When it is desired to prepare a lithium-transition metal composite oxide using the above composite transition metal hydroxide, an average oxidation number of the composite transition metal in the lithium-transition metal composite oxide ($LiMO_2$) is +3, so an oxidation process is required for changing an oxidation number. However, upon preparation of the lithium-transition metal composite oxide on a mass production scale, it is not easy to control an oxidation atmosphere in a furnace at a high temperature, due to the presence of waste gases or the like. Further, the unoxidized precursor may serve as a reaction by-product, thus having adverse effects on electrode active materials.

Meanwhile, due to structural properties of respective transition metal components and stability thereof in aqueous solutions, it is difficult, from the composite transition metal hydroxide containing Co, Ni and Mn, to prepare a composite transition metal hydroxide in the form of MOOH (M=Co, Ni, Mn) having a transition metal oxidation number of +3. Specifically, in the separate synthesis of each hydroxide of Co, Ni and Mn, it is possible to synthesize individual metal hydroxides in the form of $Ni(OH)_2$, $Co(OH)_2$ and $Mn(OH)_2$ (space group: P-3m) having a transition metal oxidation number of +2, and Co(OOH) (space group: R-3m, $P6_3$/mmc) and Mn(OOH) (space group: PBNM, P121/C1, PNMA, PNNM, B121/D1) having a transition metal oxidation number of +3. However, it is very difficult to synthesize a single phase in the form of MOOH containing two or more transition metals of Co, Ni and Mn. This is because precipitation conditions and elemental structures of Co, Ni and Mn are different from each other and therefore it is difficult to synthesize composite precursors under the same conditions (co-precipitation conditions).

To this end, inventors of the present invention have conducted various experiments based on the understanding of the above-mentioned problems. As a consequence, we have developed a novel composite transition metal compound which has a transition metal oxidation number approximate to that of a lithium-transition metal composite oxide.

That is, the inventors of the present invention have succeeded in development of $M(OH_{1-x})_2$ which has a higher transition metal oxidation state than $M(OH)_2$ having an oxidation state of +2, is a novel compound other than MOOH having an oxidation state of +3 but showing great difficulty of synthesis in practice, particularly substantially allows for mass production, and is capable of exhibiting excellent performance upon synthesis of a lithium-transition metal composite oxide.

As used herein, the phrase "composite transition metal compound has an oxidation number close to an oxidation number of a transition metal in a lithium-transition metal composite oxide" means that an oxidation number of the transition metal of the composite transition metal compound is smaller than or close to an oxidation number of a transition metal of a lithium-transition metal composite oxide prepared from a precursor containing the aforesaid compound. Therefore, when an oxidation number of the transition metal (for example, the symbol M of Formula $LiMO_2$) of the lithium-transition metal composite oxide is +3, a transition metal oxidation number of the composite transition metal oxide may have a value, for example, greater than +2 and smaller than +3.

Within the measurement error range, even when a transition metal oxidation number of the composite transition metal compound is +3, this means that the composite transition metal compound is a material having a crystal structure at least different from a conventionally known crystal structure. For example, as will be illustrated in experimental results of Experimental Example 2 which will follow, the composite transition metal compound of the present invention exhibits a different peak than a crystal structure conventionally known in connection with MOOH and $M(OH)_2$. This means that the composite transition metal oxide of the present invention has a conventionally unknown novel crystal structure, even when a value of x in the composite transition metal oxide is very close to 0.5 or even when x has a value of 0.5 at least within the measurement error range.

In one preferred embodiment, x may have a value of $0.2 \leq x < 0.5$, and more preferably a value of $0.3 \leq x < 0.5$.

In Formula 1, M is composed of two or more elements selected from the above-defined elements.

In one preferred embodiment, M contains one or more transition metals selected from the group consisting of Ni, Co and Mn, so it can be configured in a manner that properties of at least one of the transition metals can be expressed in the lithium-transition metal composite oxide. Particularly preferably, M may contain two transition metals selected from the group consisting of Ni, Co and Mn or all of them.

As preferred examples of a compound wherein M contains Ni, Co and/or Mn, mention may be made of a composite transition metal compound represented by Formula 2:

(2)

wherein $0.3 \leq b \leq 0.9$, $0.1 \leq c \leq 0.6$, $0 \leq d \leq 0.1$, $b+c+d \leq 1$ and $0 < x < 0.5$, and M' is selected from the group consisting of Al, Mg, Cr, Ti, Si and any combination thereof.

That is, the composite transition metal compound of Formula 1 may be a composite transition metal compound of Formula 2 containing Ni, Co and Mn wherein portions of Ni, Co and Mn are substituted with one or more elements selected from the group consisting of Al, Mg, Cr, Ti and Si.

The composite transition metal compound has a high content of Ni and therefore can be preferably used particularly for the preparation of a cathode active material for use in high-capacity lithium secondary batteries.

The transition metal precursor in accordance with the present invention contains at least the composite transition metal compound of Formula 1. In one preferred embodiment, the transition metal precursor may be configured to contain the composite transition metal compound at a content of 30% by weight or higher, and more preferably 50% by weight or higher. In addition to the composite transition metal compound, the remaining materials constituting the precursor of the present invention may vary, including, for example, a composite transition metal hydroxide having an oxidation state of +2.

As can be confirmed from Examples and Experimental Examples which will follow hereinafter, such a transition metal precursor can be prepared into a lithium-transition metal composite oxide having excellent properties, as compared to a transition metal precursor which does not contain the composite transition metal compound of Formula 1.

Further, the present invention provides a composite transition metal compound of Formula 1, which is per se a novel material in the art, as described hereinbefore.

Use of the transition metal precursor containing such a composite transition metal compound can simplify an oxidation or reduction process for altering an oxidation number in a process of preparing the lithium-transition metal composite oxide, so a process for controlling an oxidation or reduction atmosphere is advantageously simple and convenient. Further, the resulting lithium-transition metal composite oxide can exert excellent performance as a cathode active material, as compared to the case where such a composite transition metal compound is not used. Further, due to significant reduction of reaction by-products (such as $Li_2CO_3$, $LiOH.H_2O$, etc.) produced during the preparation of the lithium transition metal oxide, it is possible to solve the problems caused by these by-products during fabrication of the battery, such as gelation of slurry, deterioration in high-temperature performance of the battery, swelling at high temperatures, and the like.

Hereinafter, preparation of the transition metal precursor in accordance with the present invention will be described.

The transition metal precursor can be prepared by a co-precipitation method, using a transition metal-containing salt and a basic material.

The co-precipitation method is a method involving simultaneous precipitation of two or more transition metal elements in an aqueous solution, using a precipitation reaction. In a specific example, a composite transition metal compound containing two or more transition metals can be prepared by mixing transition metal-containing salts in a desired molar ratio under consideration of contents of the transition metals, thereby preparing an aqueous solution, and adding a strong base (such as sodium hydroxide, or the like) and if desired, an additive (such as ammonia source, or the like) to the aqueous solution, followed by co-precipitation of a desired product while maintaining a pH of the solution in a basic range. By appropriate control of temperature, pH, reaction time, concentration of slurry, ion concentration, etc., it is possible to control a desired average particle diameter, a particle diameter distribution, and a particle density. The reaction pH may be in the range of 9 to 13, and preferably 10 to 12. Where appropriate, the reaction may be carried out in multi-stages.

The transition metal-containing salt preferably has anions that are readily decomposable and volatile upon performing a sintering process and therefore may be sulfate or nitrate. Examples of the sulfate and nitrate may include, but are not limited to, nickel sulfate, cobalt sulfate, manganese sulfate, nickel nitrate, cobalt nitrate, and manganese nitrate.

Examples of the basic material may include, but are not limited to, sodium hydroxide, potassium hydroxide, and lithium hydroxide. Preferred is sodium hydroxide.

In one preferred embodiment, it is possible to further add an additive and/or alkali carbonate capable of forming a complex with a transition metal during the co-precipitation process. Examples of the additive that can be used in the present invention may include ammonium ion sources, ethylene diamine compounds, citric acid compounds, and the like. Examples of the ammonium ion source may include aqueous ammonia, ammonium sulfate aqueous solution, ammonium nitrate aqueous solution, and so on. The alkali carbonate may be selected from the group consisting of ammonium carbonate, sodium carbonate, potassium carbonate and lithium carbonate. These materials may be used alone or in any combination thereof.

Amounts of the additive and the alkali carbonate to be added may be appropriately determined taking into consideration amounts of transition metal-containing salts, pH, and so on.

Depending on reaction conditions, a transition metal precursor containing only the composite transition metal compound of Formula 1 may be prepared or otherwise a transition metal precursor simultaneously containing other composite transition metal compounds may be prepared. The synthesis details of such transition metal precursors may refer to the following Examples.

In accordance with another aspect of the present invention, there is provided a lithium-transition metal composite oxide prepared from the aforesaid transition metal precursor. Specifically, a lithium-transition metal composite oxide, which is a cathode active material for a lithium secondary battery, can be prepared by sintering the transition metal precursor and the lithium-containing material.

The resulting lithium-transition metal composite oxide may be preferably used as an electrode active material for lithium secondary batteries. The lithium-transition metal composite oxide may be used either alone or in admixture with other known electrode active materials for lithium secondary batteries.

According to the confirmation by the inventors of the present invention, the lithium-transition metal composite oxide prepared using the aforesaid transition metal precursor exhibited a very low content of lithium by-products such as lithium carbonate ($Li_2CO_3$) or lithium hydroxide (LiOH). Therefore, when this lithium-transition metal composite oxide is used as an electrode active material of the lithium secondary battery, there are provided various advantages including superior high temperature stability (such as excellent sintering and storage stability, and reduction of gas evolution), high capacity, and superior cycle characteristics.

There is no particular limit to the lithium-containing material, which may include, for example, lithium hydroxide, lithium carbonate, and lithium oxide. Preferred is lithium carbonate ($Li_2CO_3$) or lithium hydroxide (LiOH).

In addition, the lithium transition metal oxide is a compound containing two or more transition metals. Examples of the lithium transition metal oxide may include, but are not limited to, layered compounds such as lithium cobalt oxide ($LiCoO_2$) and lithium nickel oxide ($LiNiO_2$) substituted with one or more transition metals; lithium manganese oxides substituted with one or more transition metals; lithiated nickel oxides of Formula $LiNi_{1-y}M_yO_2$ (M=Co, Mn, Al, Cu, Fe, Mg, B, Cr, Zn, Ga or any combination thereof, and $0.01 \leq y \leq 0.7$); and lithium nickel-cobalt-manganese composite oxides represented by Formula $Li_{1+z}Ni_bMn_cCo_{1-(b+c+d)}M_dO_{(2-e)}N_e$ ($-0.5 \leq z \leq 0.5$, $0.3 \leq b \leq 0.9$, $0.1 \leq c \leq 0.6$, $0 \leq d \leq 0.1$, $0 \leq e \leq 0.05$ and $b+c+d<1$; M=Al, Mg, Cr, Ti, Si or Y; and N=F, P or Cl), such as $Li_{1+z}Ni_{1/3}Co_{1/3}Mn_{1/3}O_2$ and $Li_{1+z}Ni_{0.4}Mn_{0.4}Co_{0.2}O_2$.

Particularly preferably, the lithium-transition metal composite oxide may be a lithium-transition metal composite oxide containing all of Co, Ni and Mn.

Reaction conditions of the transition metal precursor and the lithium-containing material for the preparation of lithium-transition metal composite oxides are known in the art, so details thereof will be omitted herein.

Further, the present invention provides a cathode comprising the aforesaid lithium-transition metal composite oxide as a cathode active material and a lithium secondary battery comprising the same.

The cathode is, for example, fabricated by applying a mixture of a cathode active material in accordance with the present invention, a conductive material and a binder to a cathode current collector, followed by drying. If necessary, a filler may be further added to the above mixture.

The cathode current collector is generally fabricated to have a thickness of 3 to 500 μm. There is no particular limit to materials for the cathode current collector, so long as they have high conductivity without causing chemical changes in the fabricated battery. As examples of the materials for the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

The conductive material is typically added in an amount of 1 to 20% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding of the electrode active material with the conductive material, and in binding of the electrode active material with the current collector. The binder is typically added in an amount of 1 to 20% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The lithium secondary battery is generally composed of a cathode, an anode, a separator, and a lithium salt-containing non-aqueous electrolyte. Other components of the lithium secondary battery in accordance with the present invention will be described below.

The anode is fabricated by applying an anode material to an anode current collector, followed by drying. If necessary, other components as described above may be further included.

Examples of the anode materials utilizable in the present invention may include carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; $0<x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

The anode current collector is generally fabricated to have a thickness of 3 to 500 μm. There is no particular limit to materials for the anode current collector, so long as they have suitable conductivity without causing chemical changes in the fabricated battery. As examples of materials for the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be processed to form fine irregularities on the surfaces thereof so as to enhance adhesion to the anode active material. In addition, the anode current collector may be used in various forms including films, sheets, foils, nets, porous structures, foams and non-woven fabrics.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or a glass fiber or polyethylene, which have chemical resistance and hydrophobicity, are used. When a solid electrolyte such as a polymer is employed as the electrolyte, the solid electrolyte may also serve as both the separator and electrolyte.

The lithium-containing non-aqueous electrolyte is composed of a non-aqueous electrolyte and lithium. As the non-aqueous electrolyte, a non-aqueous electrolyte solution, an organic solid electrolyte or an inorganic solid electrolyte may be utilized.

Examples of the non-aqueous electrolyte solution that can be used in the present invention may include aprotic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate and the like.

Examples of the organic solid electrolyte utilized in the present invention may include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte utilized in the present invention may include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following Examples. These examples are provided only for illustrating the present invention and should not be construed as limiting the scope and spirit of the present invention.

Example 1

A 3 L wet reactor tank was filled with 2 L of distilled water and was continuously purged with nitrogen gas at a rate of 1 L/min to remove dissolved oxygen. Distilled water in the tank was maintained at a temperature of 45 to 50° C. using a thermostat. In addition, the distilled water in the tank was stirred at a rate of 1000 to 1200 rpm using an impeller connected to a motor installed outside the tank.

Nickel sulfate, cobalt sulfate and manganese sulfate were mixed in a molar ratio of 0.55:0.2:0.25 to prepare a 1.5M transition metal aqueous solution. In addition, a 3M sodium hydroxide aqueous solution was also prepared. The transition metal aqueous solution was continuously pumped with a metering pump at a rate of 0.18 L/hr to the wet reactor tank. The sodium hydroxide aqueous solution was pumped in a rate-variable manner by a control unit for adjusting a pH of the distilled water in the tank such that the distilled water in the wet reactor tank was maintained at a pH of 11.0 to 11.5. A 30% ammonia solution as an additive was continuously co-pumped to the reactor at a rate of 0.035 to 0.04 L/hr.

Flow rates of the transition metal aqueous solution, the sodium hydroxide aqueous solution and the ammonia solution were adjusted such that an average residence time of the solutions in the wet reactor tank was 5 to 6 hours. After the reaction in the tank arrived at a steady state, a certain duration of time was given to synthesize a composite transition metal precursor with a higher density.

After the arrival of a steady state, the nickel-cobalt-manganese composite transition metal precursor, which was prepared by 20-hour continuous reaction between transition metal ions of the transition metal aqueous solution, hydroxide ions of the sodium hydroxide and ammonia ions of the ammonia solution, was continuously obtained through an overflow pipe installed on the side top of the tank.

The resulting composite transition metal precursor was washed several times with distilled water and dried in a 120° C. constant-temperature drying oven for 24 hours to obtain a nickel-cobalt-manganese composite transition metal precursor.

Example 2

A transition metal precursor was prepared in the same manner as in Example 1, except that an internal temperature of the wet reactor tank was maintained at a temperature of 40 to 45° C.

Example 3

A transition metal precursor was prepared in the same manner as in Example 1, except that an ammonia solution was added at a rate of 0.03 to 0.035 L/hr to the wet reactor tank.

Example 4

A transition metal precursor was prepared in the same manner as in Example 1, except that the concentration of a transition metal aqueous solution containing nickel sulfate, cobalt sulfate and manganese sulfate was changed to 2M, and the concentration of a sodium hydroxide aqueous solution was changed to 4M.

Example 5

A transition metal precursor was prepared in the same manner as in Example 1, except that an ammonia solution was added at a rate of 0.03 to 0.035 L/hr to the wet reactor tank, and an internal temperature of the wet reactor tank was maintained at a temperature of 40 to 45° C.

Example 6

A transition metal precursor was prepared in the same manner as in Example 1, except that the pumping was conducted in a rate-variable manner such that a pH of the distilled water in the wet reactor tank was maintained within the range of 10.5 to 11.0.

Example 7

A transition metal precursor was prepared in the same manner as in Example 1, except that an internal temperature of the wet reactor tank was maintained at a temperature of 40 to 45° C., and the pumping was conducted in a rate-variable manner such that a pH of the distilled water in the wet reactor tank was maintained within the range of 10.5 to 11.0.

Comparative Example 1

A 3 L wet reactor tank was filled with 2 L of distilled water and was continuously purged with nitrogen gas at a rate of 1

L/min to remove dissolved oxygen. Distilled water in the tank was maintained at a temperature of 40 to 45° C. using a thermostat. In addition, the distilled water in the tank was stirred at a rate of 1000 to 1200 rpm using an impeller connected to a motor installed outside the tank.

Nickel sulfate, cobalt sulfate and manganese sulfate were mixed in a molar ratio of 0.55:0.2:0.25 to prepare a 2.0M transition metal aqueous solution. In addition, a 4M sodium hydroxide aqueous solution was also prepared. The transition metal aqueous solution was continuously pumped with a metering pump at a rate of 0.18 L/hr to the wet reactor tank. The sodium hydroxide aqueous solution was pumped in a rate-variable manner by a control unit for adjusting a pH of the distilled water in the tank such that the distilled water in the wet reactor tank was maintained at a pH of 10.0 to 10.5. A 30% ammonia solution as an additive was continuously pumped to the reactor at a rate of 0.01 to 0.015 L/hr, resulting in synthesis of a composite transition metal precursor.

Experimental Example 1

A neutron diffraction experiment was performed on the nickel-cobalt-manganese composite transition metal precursor prepared in Example 1.

The neutron diffraction measurement was performed at room temperature using HANARO HRPD equipment with a 32 He-3 Multi-detector system and a Ge (331) monochromator, installed in the Korea Atomic Energy Research Institute (KAERI) in Daejeon, South Korea. The data were collected between $2\theta=10$ and $150°$ in steps of $\Delta(2\theta)=0.05°$ for 3 hours at a wavelength of 1.8334 Å. An amount of the sample was in the range of 10 to 15 g.

A combined Rietveld refinement of X-ray and neutron diffraction data was performed using a TOPAS program (Refinement parameters: scale factors, background, unit cell parameters, atomic coordinates, thermal parameters, occupancy for H1).

The results obtained are given in FIG. 1 and Table 1 below.

TABLE 1

| Sample | Ref [(Ni$_{0.55}$Co$_{0.2}$Mn$_{0.25}$)(OH$_{0.53}$)$_2$] |
|---|---|
| Space group | P-3m |
| a(Å) | 3.0350(2) |
| c(Å) | 4.5523(7) |
| Cry Size (nm) | 41.5(5) |

| Site | Np | x | y | z | Atom | Occ. | Beq. |
|---|---|---|---|---|---|---|---|
| Ni | 1 | 0 | 0 | 0 | Ni | 0.55 | 1.73(6) |
|  |  |  |  |  | Co | 0.2 |  |
|  |  |  |  |  | Mn | 0.25 |  |
| O | 2 | 0.33333 | 0.66667 | 0.2122(8) | O | 1 |  |
| H | 2 | 0.33333 | 0.66667 | 0.396(3) | H | 0.526(6) |  |

*Values in parentheses refer to standard deviations, typically having an error range of about 3δ.

As shown from the results of FIG. 1 and Table 1, the nickel-cobalt-manganese composite transition metal precursor prepared in Example 1 was M(OH$_{1-x}$)$_2$ having a novel structure which was conventionally not known in the art.

Experimental Example 2

X-ray diffraction experiments were performed on the nickel-cobalt-manganese composite transition metal precursors prepared in Examples 1 to 7 and Comparative Example 1, respectively.

The X-ray diffraction (XRD) data were collected between $15°\leq 2\theta \leq 75°$ in steps of $\Delta(2\theta)=0.025°$ for 2 hours at room temperature, using a Bragg-Brentano diffractometer (Bruker-AXS D4 Endeavor) with a Cu X-ray tube and a Lynxeye detector.

A combined Rietveld refinement of X-ray and neutron diffraction data was performed using a TOPAS program (Refinement parameters: scale factors, background, unit cell parameters, atomic coordinates, thermal parameters, occupancy for H1).

Figure 2:
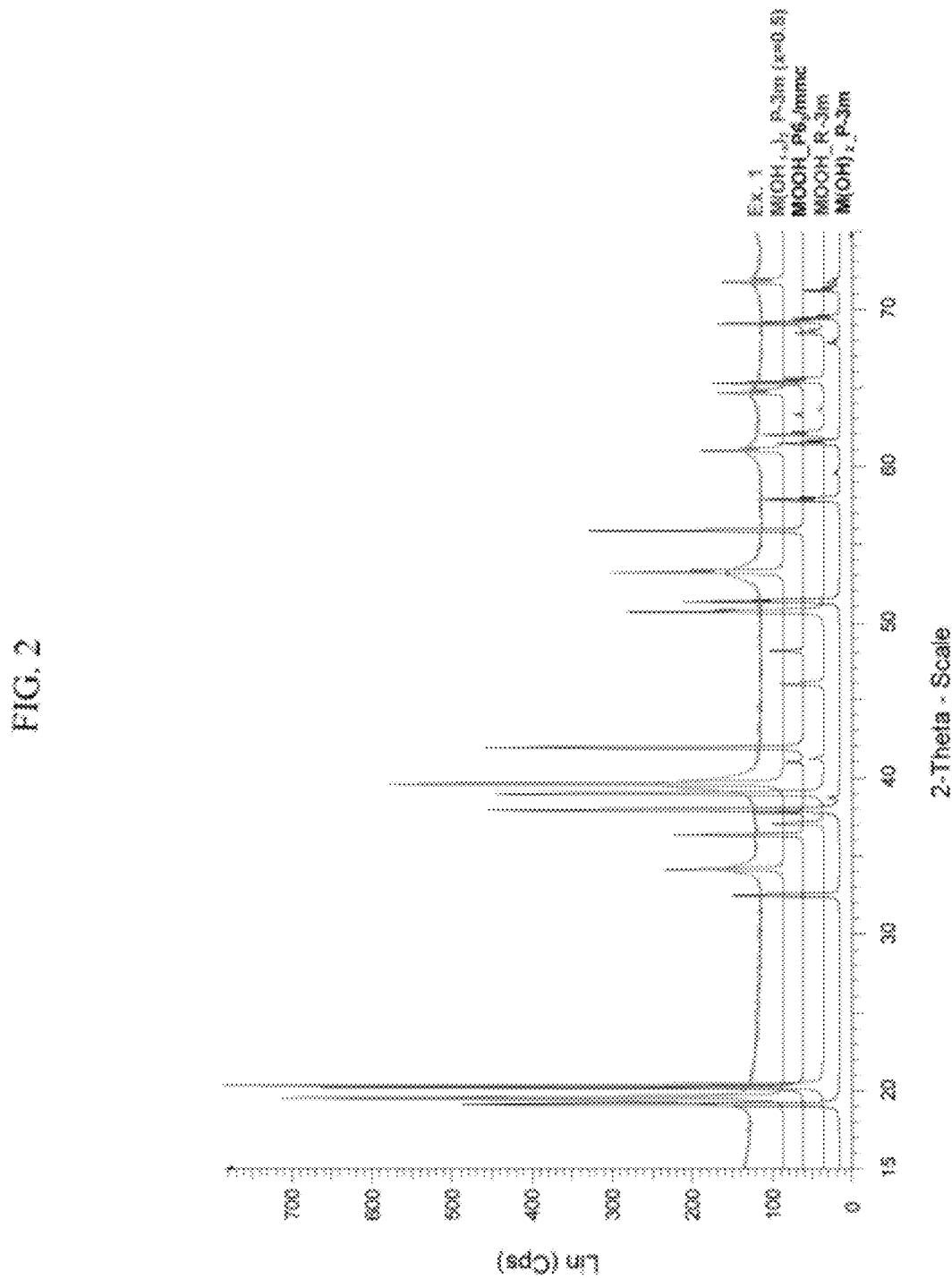
FIG. 2 is a graph showing the results of Experimental Example 2 in which an X-ray diffraction peak of a nickel-cobalt-manganese composite transition metal precursor in accordance with Example 1 was compared with diffraction peaks of a conventional precursor $M(OH)_2$ and MOOH materials having a theoretical crystal structure.

The results obtained are given in FIGS. 2 and 3 and Table 2 below, respectively. FIG. 2 shows the comparative results between the X-ray diffraction peak of the nickel-cobalt-manganese composite transition metal precursor of Example 1 and diffraction peaks of the conventional precursor M(OH)$_2$ and MOOH having a conventional theoretical crystal structure. Table 2 below shows the analytical results for X-ray peaks of FIG. 3.

TABLE 2

| Samples | (101) | (001) | (101)/(001) | (101)' | (101)/[(101) + (101)'] |
|---|---|---|---|---|---|
| Ex. 1 | 16671 | 24248 | 0.69 | — | 100% |
| Ex. 2 | 10734 | 31336 | 0.34 | 3116 | 77.5% |
| Ex. 3 | 10802 | 31960 | 0.34 | 2456 | 81% |
| Ex. 4 | 43990 | 99076 | 0.44 | 15735 | 74% |
| Ex. 5 | 20383 | 51299 | 0.40 | 6204 | 77% |
| Ex. 6 | 10501 | 31895 | 0.33 | 2653 | 79% |
| Ex. 7 | 46791 | 99410 | 0.47 | 48316 | 50% |
| Comp. Ex. 1 | — | (001)' 51506 | (101)'/(001)' 0.84 | 43290 | 0 |

(101)', (001)': M(OH)$_2$
(101), (001): M(OH$_{1-x}$)$_2$
* Peaks of two materials were overlapped in the equatorial intensity ratio of (001) (with the exception of Comparative Example 1).

First, it can be seen from FIG. 2 that the nickel-cobalt-manganese composite transition metal precursor prepared in Example 1 is a material having a novel structure which was conventionally not known in the art. Specifically, the transition metal precursor of Example 1 has a structure which is distinctly different not only from the conventionally known transition metal precursor M(OH)$_2$, but also from MOOH. Further, when x has a value very close to 0.5 within the specified range of the present invention, or x has a value of substantially 0.5 within the error range of experimental measurements, that is, even when a transition metal oxidation number of the composite transition metal precursor has a value of +3, the nickel-cobalt-manganese composite transition metal precursor in accordance with the present invention is believed to be a novel material which is totally different from MOOH.

Figure 3:
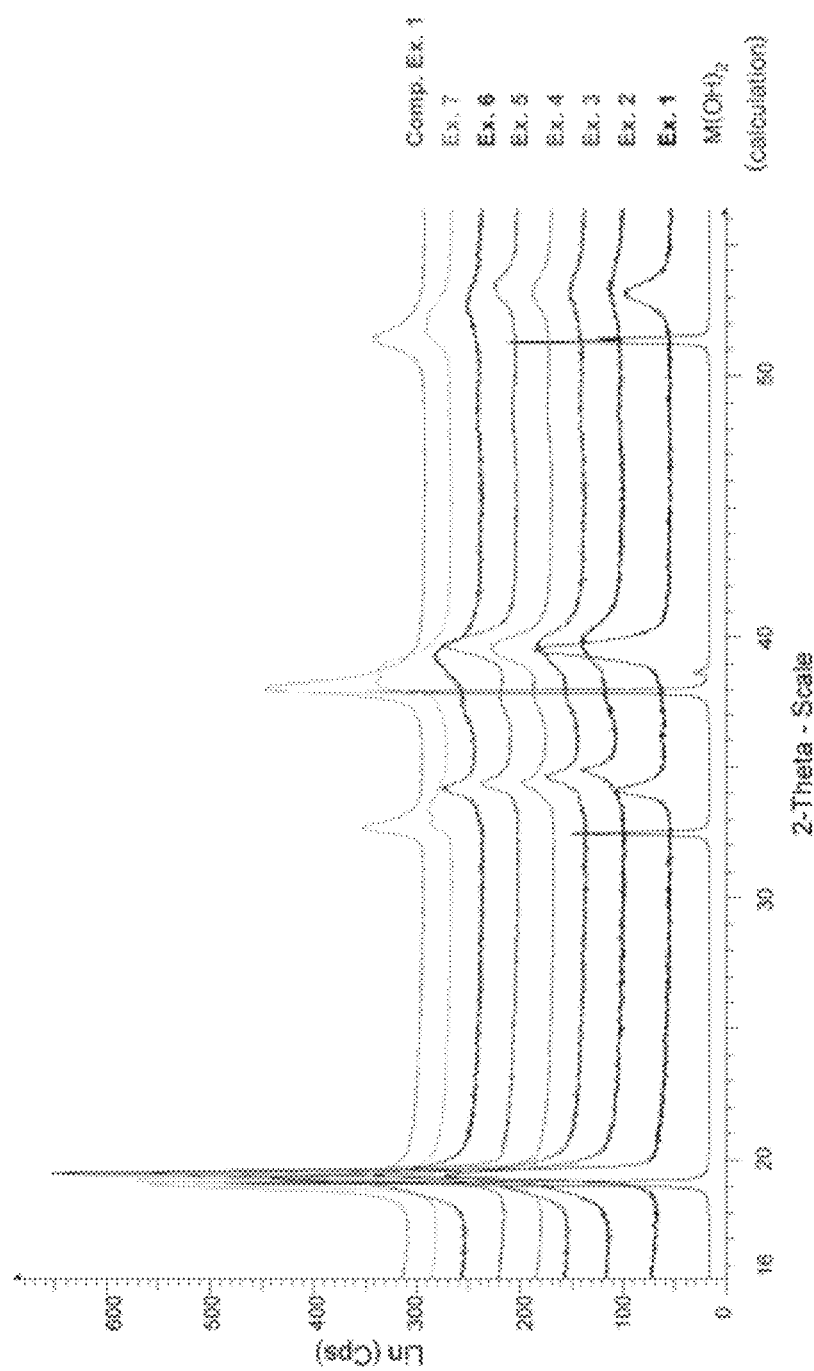
FIG. 3 is a graph showing the comparative results between X-ray diffraction peaks obtained in Experimental Example 2.

As shown in FIG. 3 and Table 2, Example 1 exhibited only a peak of M(OH$_{1-x}$)$_2$, whereas Examples 2 to 7 exhibited an integrated intensity ratio of M(OH$_{1-x}$)$_2$ of 50% or higher in terms of peak ratio. From these results, it can be seen that the nickel-cobalt-manganese composite transition metal precursor of Example 1 has only M(OH$_{1-x}$)$_2$, whereas the nickel-cobalt-manganese composite transition metal precursors of Examples 2 to 7 have coexistence of M(OH$_{1-x}$)$_2$ and M(OH)$_2$. On the other hand, it can be seen that the nickel-cobalt-manganese composite transition metal precursor of Comparative Example 1 has only M(OH)$_2$.

In addition, from comparative calculation between the peak position of Example 1 and the peak position of M(OH)$_2$, the precursor of Example 6 can be refined into M(OH$_{1-x}$)$_2$ wherein $x \leq 0.35$.

Examples 8 to 14 and Comparative Example 2

Each of the nickel-cobalt-manganese composite transition metal precursors prepared in Examples 1 to 7 and Comparative Example 1 was mixed with $Li_2CO_3$ in a ratio of 1:1 (w/w). Each mixture was heated at an elevation rate of 5° C./min and sintered at 920° C. for 10 hours to prepare a cathode active material powder of $Li[Ni_{0.55}Co_{0.2}Mn_{0.25}]O_2$.

The thus-prepared cathode active material powder, a conductive material (Denka black) and a binder (KF1100) were mixed in a weight ratio of 95:2.5:2.5 to prepare a slurry. The slurry was uniformly coated on aluminum (Al) foil having a thickness of 20 μm. The slurry-coated Al foil was dried at 130° C. to prepare a cathode for a lithium secondary battery.

A 2016 coin cell was fabricated using the thus-prepared lithium secondary battery cathode, lithium metal foil as a counter electrode (anode), a polyethylene film (Celgard, thickness: 20 μm) as a separator, and a 1M $LiPF_6$ solution in a 1:2:1 mixture of ethylene carbonate, dimethylene carbonate and diethyl carbonate as a liquid electrolyte.

Experimental Example 3

The characteristics of the cathode active material in coin cells prepared in Examples 8 to 14 and Comparative Example 2 were evaluated using an electrochemical analysis system (Toyo System, Toscat 3100U) in the voltage range of 3.0 to 4.25 V.

The results obtained are given in Table 3 below.

TABLE 3

| Samples | Charge (mAh/g) | Discharge (mAh/g) | Efficiency (%) |
|---|---|---|---|
| Ex. 8 (Ex. 1) | 188.0 | 167.1 | 88.9 |
| Ex. 9 (Ex. 2) | 185.5 | 163.4 | 87.1 |
| Ex. 10 (Ex. 3) | 186.1 | 163.4 | 87.8 |
| Ex. 11 (Ex. 4) | 184.3 | 160.0 | 86.8 |
| Ex. 12 (Ex. 5) | 184.0 | 160.1 | 87.0 |
| Ex. 13 (Ex. 6) | 181.1 | 156.1 | 86.2 |
| Ex. 14 (Ex. 7) | 180.4 | 155.0 | 85.9 |
| Comp. Ex. 2 (Comp. Ex. 1) | 178.7 | 141.9 | 79.4 |

As can be seen from the results of Table 3, the lithium secondary batteries of Examples 8 to 14, which contain, as a cathode active material, the lithium-transition metal composite oxide prepared using the transition metal precursor in accordance with the present invention, exhibited superior performance even with the same composition, as compared to the lithium secondary battery of Comparative Example 2 prepared using the $M(OH)_2$ precursor.

Experimental Example 4

Li by-product values were confirmed by pH titrations of the lithium-transition metal composite oxides prepared in Examples 8 to 14 and Comparative Example 2.

Specifically, 10 g of each lithium-transition metal composite oxide was mixed with 100 mL of distilled water for 5 min, and the lithium-transition metal composite oxide was removed by filtering. The resulting solution was titrated with a 0.1N HCl solution to measure values of lithium by-products. Titration was conducted to a pH of 5.

The results obtained are given in Table 4 below.

TABLE 4

| Samples | Initial pH | 0.1N HCl (mL) | Li by-products (wt %) |
|---|---|---|---|
| Ex. 8 (Ex. 1) | 10.9 | 4.8 | 0.115 |
| Ex. 9 (Ex. 2) | 11.1 | 5.8 | 0.138 |
| Ex. 10 (Ex. 3) | 11.2 | 5.3 | 0.127 |
| Ex. 11 (Ex. 4) | 11.4 | 6.7 | 0.161 |
| Ex. 12 (Ex. 5) | 11.4 | 6.1 | 0.148 |
| Ex. 13 (Ex. 6) | 11.5 | 7.4 | 0.172 |
| Ex. 14 (Ex. 7) | 11.5 | 7.8 | 0.181 |
| Comp. Ex. 2 (Comp. Ex. 1) | 11.8 | 11.5 | 0.256 |

From the results of Table 4, it can be seen that the lithium-transition metal composite oxides (Examples 8 to 14) prepared using the transition metal precursor in accordance with the present invention exhibited a significant reduction of Li by-products, as compared to the lithium-transition metal composite oxide of Comparative Example 2 prepared using the $M(OH)_2$ precursor. It was also confirmed that an amount of the Li by-products significantly decreases as a content of $M(OH_{1-x})_2$ increases.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, a novel transition metal precursor for the preparation of a lithium-transition metal composite oxide in accordance with the present invention has an oxidation number of a transition metal approximate to an oxidation number of a transition metal in the lithium-transition metal composite oxide. Therefore, when the lithium-transition metal composite oxide is prepared using such a precursor, an oxidation or reduction process for varying an oxidation number can be simplified, resulting in higher process efficiency. In addition, the-thus prepared lithium-transition metal composite oxide not only exhibits excellent performance as a cathode active material, but also shows significantly less production of reaction by-products such as $Li_2CO_3$ or $LiOH.H_2O$, which provide a solution to problems such as gelation of slurry, deterioration in high-temperature performance of the battery, swelling at high temperatures, etc., due to the reaction by-products.

What is claimed is:

1. A transition metal precursor comprising a composite transition metal compound represented by Formula 1, as a transition metal precursor used in the preparation of a lithium-transition metal composite oxide:

$$M(OH_{1-x})_2 \qquad (1)$$

wherein:

M is two or more selected from the group consisting of Ni, Co, Mn, Al, Cu, Fe, Mg, B, Cr and the transition metals of 2 period in the Periodic Table of the Elements; and 0<x<0.5.

2. The transition metal precursor according to claim 1, wherein an oxidation number of the M in Formula 1 approximates to an oxidation number of a transition metal in the lithium-transition metal composite oxide.

3. The transition metal precursor according to claim 2, wherein an oxidation number of the M in Formula 1 approximates to +3.

4. The transition metal precursor according to claim 1, wherein the x in Formula 1 has a value of $0.2 \leq x < 0.5$.

5. The transition metal precursor according to claim 1, wherein the x in Formula 1 has a value of $0.3 \leq x < 0.5$.

6. The transition metal precursor according to claim 1, wherein the M contains one or more transition metals selected from the group consisting of Ni, Co and Mn.

7. The transition metal precursor according to claim 6, wherein the M contains two transition metals selected from the group consisting of Ni, Co and Mn or all of them.

8. The transition metal precursor according to claim 1, wherein the composite transition metal compound is a composite transition metal compound represented by Formula 2:

$$Ni_bMn_cCo_{1-(b+c+d)}M'_d(OH_{1-x})_2 \quad (2)$$

wherein:
$0.3 \leq b \leq 0.9$;
$0.1 \leq c \leq 0.6$;
$0 \leq d \leq 0.1$;
$b+c+d \leq 1$;
$0 < x < 0.5$; and
M' is selected from the group consisting of Al, Mg, Cr, Ti, Si and any combination thereof.

9. The transition metal precursor according to claim 1, wherein the composite transition metal compound has a content of 30% by weight or higher, based on the total weight of the transition metal precursor.

10. The transition metal precursor according to claim 9, wherein the composite transition metal compound has a content of 50% by weight or higher, based on the total weight of the transition metal precursor.

11. A composite transition metal compound represented by Formula 1:

$$M(OH_{1-x})_2 \quad (1)$$

wherein M and x are as defined in claim 1.

12. A lithium-transition metal composite oxide prepared by using the transition metal precursor of claim 1.

13. A lithium secondary battery comprising the lithium-transition metal composite oxide of claim 12 as a cathode active material.

* * * * *